United States Patent Office 3,501,422
Patented Mar. 17, 1970

3,501,422
HIGH TEAR STRENGTH VULCANIZATES BASED ON CIS-POLYBUTADIENE
Karl-Heinz Nordsiek, Hamm, Upper Marl, and Franz-Peter van de Kamp, Friedrich Zeppernick, and Günter Simon, Marl, Germany, assignors to Chemische Werke Huls Aktiengesellschaft, Marl, Germany
No Drawing. Filed July 13, 1965, Ser. No. 471,750
Claims priority, application Germany, July 14, 1964, 1,745,673
Int. Cl. C08d 9/00
U.S. Cl. 260—5                                           25 Claims

ABSTRACT OF THE DISCLOSURE

A high tear strength vulcanized composition comprising on a weight basis 0.5–1.2 parts of N-substituted benzthiazyl sulfenamide, 1.2–2.7 parts sulfur, 40–80 parts carbon black, about 90–70 parts cis-polybutadiene and about 10–30 parts of an elastomer selected from the group consisting of polybutadiene having other than a 1,4-cis-structure, natural rubber, polyisoprene, poly-2-chloro-butadiene, polyisobutylene, butyl rubber, polybutadiene - styrene, polybutadiene - acrylonitrile, polybutadiene - styrene - acrylonitrile, and polyethylene-propylene, and 5–15 parts of an ethylenically unsaturated hydrocarbon carboxylic acid salt of 10–30 carbon atoms of a metal selected from the group consisting of alkali metal, alkaline earth metal, zinc and aluminum.

This invention relates to the production of vulcanized cis-polybutadiene having improved tear strengths, and in particular to such vulcanizates which are reinforced with carbon black and the like.

It is known that carbon black reinforced vulcanized products of cis-polybutadiene exhibit a poor tear strength, i.e., an insufficient resistance to tearing as well as an insufficient resistance to tear widening (R. Ulbrich, "Gummi, Asbest, Kunststoffe" [Rubber, Asbestos Plastics] 13, 1026 (1960); E. Madge, "Chem. and Ind." (1962), 1806). Furthermore, the tear strength of such carbon black filled cis-polybutadiene vulcanized products cannot be improved by simple conventional methods, such as, for example, by varying the vulcanization recipe and/or by the addition of plasticizers. Thus, the tear strengths of carbon black filled cis-polybutadiene vulcanized products produced according to conventional optimum operating recipes are substantially poorer than that of natural rubber, and even a little worse than that of SBR (butadiene-styrene copolymer).

The "chipping and chunking" phenomena of truck tires with treads made of cis-polybutadiene are caused by this poor tear strength of the cis-polybutadiene. For the utilization of cis-polybutadiene in automobile and particularly truck tires, it is thus essential to improve the tear strength of the carbon black filled vulcanized product.

A principal object of this invention, therefore, is to provide vulcanized cis-polybutadiene compositions having improved tear strength.

Other objects include novel vulcanizable compositions and processes for making and using same.

Upon further study of the specification and claims, other objects and advantages of the present invention will become apparent.

The attainment of these objects is based on our discovery that carbon black filled vulcanized products containing cis-polybutadiene, having a high tear strength can be produced is a cis-polybutadiene containing about 10–30% by weight, based on the total weight of the polymers, of another elastomer is vulcanized in a manner known per se with the vulcanization system N-substituted benzthiazyl-sulfenamide/sulfur in quantities of 0.5 to 1.2/0.7 to 2.0 parts by weight, respectively, based on 100 parts by weight of rubber employed, at temperatures of 130–170° C.

The fact that the tear strength can be increased in this simple manner is the more surprising as the other elastomer to be added can have a substantially lower tear strength per se, than its admixture with cis-polybutadiene. In all cases, when replacing a preferred optimum amount of approximately 20% of the cis-polybutadiene by the other elastomer in carbon black filled vulcanized products, a maximum tear strength is obtained. This value is, in every case, higher than that value which results from the additive calculation of the tear strength values of the two components, thus achieving a clear synergistic effect.

In case of higher proportions of the other elastomer, i.e., above 30%, the tear strength decreases, but a synergistic effect is still present. Likewise, when the elastomer content is lower than 10%, the tear strength is less, but synergism nevertheless remains. Thus, the expression "about 10–30%" is intended to include any proportion of the added elastomer which results in a synergistic effect with respect to tear strength.

This surprising result is obtained only if, in addition to replacing about 10.30% of the cis-polybutadiene by another elastomer, there is present a specified cross-linking condition, such as achieved with the vulcanization system of N - substituted benzthiazyl - sulfenamide/sulfur in quantities of 0.5–1.2/0.7–2.0 parts by weight, respectively, based on 100 parts of the rubber used. If this cross-linking condition is altered, for example by decreasing or increasing the sulfur quantity, with the vulcanization system remaining the same, the tear strength of the vulcanized product is substantially decreased.

Preferred elastomers for replacing the cis-polybutadiene to the extent of 10–30% by weight are, on the one hand, polybutadienes of a structure other than cis, for example trans-polybutadiene, or polybutadienes which are produced by emulsion polymerization and/or by solution polymerization in the presence of alkali metals or organo-metallic compounds thereof. On the other hand, natural rubbers and homopolymers can be utilized such as, for example, natural rubber, polyisoprene, poly-2-chlorobutadiene, polyisobutylene, and butyl rubber (polyisobutylene-isoprene copolymer). Furthermore copolymers are suitable, for example those from butadiene-styrene, butadiene-acrylonitrile, butadiene - styrene - acrylonitrile, and ethylene-propylene, as far as they are elastomers.

Finally, it is also possible to employ mixtures of the above-mentioned elastomers. In other words, any elastomer or combination of elastomers having a structure other than cis-polybutadiene are contemplated.

Regarding the cis-polybutadiene, this expression shall mean such butadiene polymers which have a content of at least 85% cis-1,4-double bonds, and less than 5% trans-1,4-double bonds made in solution with organo-metallic catalysts.

The mixture of the cis-polybutadiene with the other elastomers can be prepared before working up the cis-polybutadiene by addition to a solution, or thereafter by admixture on a mill or in an internal mixer.

The mixtures can contain 2 to 70 parts by weight, preferably 5 to 50 parts by weight, of total oil, based on 100 parts by weight of the rubber used, without decreasing the tear strength substantially. These oils can be of paraffinic, naphthenic, or aromatic character. The content in carbon black can amount to 40-80, preferably 45-60 parts by weight, based on 100 parts by weight of the rubber used. In addition thereto, it is also possible to use other known fillers in replacement of carbon black, up to 100%, under the same conditions with similar advantages.

N-substituted benzthiazyl-sulfenamides are, for example, N-tert. butyl-, N-cyclohexyl-, N-diethyl-, and morpholinyl-sulfenamide.

Preferably N-cyclohexyl-benzthiazyl-sulfenamide is employed.

The quantities of these sulfenamides vary between 0.5 and 1.2, preferably 0.6 to 1.0 parts by weight, based on 100 parts by weight of the rubber used. The quantity of the sulfur which is furthermore contained in the vulcanization system amounts to 0.7 to 2.0, preferably 0.8 to 1.3 parts by weight, based on 100 parts by weight of the rubber used.

A further improvement of the tear strength can be achieved in accordance with a particularly preferred embodiment of the present process, if there are added to the mixture of the invention 5 to 15 parts by weight of an alkali metal, alkaline earth, aluminum, or zinc salt of higher unsaturated carboxylic acids, of 10 to 30 carbon atoms and containing 1-5 double bonds, and being preferably hydrocarbon carboxylic acids, for example oleic acid, abietic acid, linoleic acid, and/or mixtures thereof, and additionally 0.5 to 1.5 parts by weight of sulfur, all quantities being based on 100 parts by weight of the rubber.

Said mixtures are vulcanized in the usual manner without alteration of given apparatus.

The preferred vulcanization temperature is between 130 and 170° C. The specific temperature range relies upon the intended reaction velocity.

The vulcanized products produced in accordance with the present process can be advantageously used in the manufacture of automobile, particularly truck, tires and in the production of other articles of which a high tear strength is demanded.

Without further elaboration, it is believed that one skilled in the art can, using the preceding description, utilize the present invention to its fullest extent. The following preferred specific embodiments are, therefore, to be construed as merely illustrative, and not limitative, of the remainder of the specification and claims in any way whatsoever. In these examples, all parts are by weight, unless otherwise indicated.

EXAMPLE 1

Table 1 discloses the tear strength of known vulcanized products.

TABLE 1

Tear strength of vulcanized products from various rubbers, filled with 50 parts by weight of "HAF" (high abrasion furnace) carbon black,

| Rubber | Tear strength, in kilograms | |
|---|---|---|
| | (a) Ring Test according to Pohle [1] | (b) Angle Test according to Graves [2] |
| Cis-polybutadiene | 10-12 | 13-14 |
| SBR | 12-14 | 15 |
| Natural rubber | 35-40 | 55 |

[1] DIN (German Industry Norm) 53,504.
[2] DIN (German Industry Norm) 53,515, ASTM D 624.

Furthermore, it is demonstrated that, in case of cis-polybutadiene vulcanized products, it is impossible to achieve an improvement in the tear strength by simple methods, such as, for example, by varying the vulcanization system, adding plasticizers or factice (see Tables 2 and 3).

TABLE 2

Tear strength of cis-polybutadiene vulcanized products

Recipe: Parts by weight
  Cis-polybutadiene _____ 100
  "HAF" carbon black _____ 50
  Stearic acid _____ 2
  Zinc oxide _____ 3
  Phenyl-β-naphthylamine _____ 1
  Vulcanization period as stated.
  Heating: 30 minutes, 150° C.

TABLE 3

The results are tabulated in Table 3 for the additions which are employed, these additions likewise being tabulated.

| Vulcanization Agent in parts | Other Additives in parts | Tear Strength (kg.) Ring Test |
|---|---|---|
| A: 0.75; S: 1.0 | | 11 |
| A: 0.75; S: 1.5 | | 10 |
| A: 0.75; S: 2.0 | | 9 |
| A: 1.0; S: 1.0 | | 10 |
| A: 1.0; S: 1.5 | | 9 |
| A: 0.75; S: 0.5 | 8 Oil | 10 |
| A: 0.75; S: 0.75 | do | 12 |
| A: 0.75; S: 1.0 | do | 11 |
| A: 0.75; S: 1.4 | do | 9 |
| A: 0.75; S: 2.0 | do | 9 |
| A: 0.9; S: 1.5 | 5 Resinous acid | 9 |
| A: 0.6; S: 0.6 | 5 Factice | 4 |
| A: 0.6; S: 1.0 | do | 8 |
| A: 0.6; S: 2.0 | do | 8 |
| A: 1.0; S: 0.6 | do | 8 |
| A: 1.0; S: 1.0 | do | 9 |
| A: 1.0; S: 2.0 | do | 6 |
| A: 0.8; M: 0.8 | | 7 |
| A: 0.8; M: 1.6 | | 8 |
| A: 1.2; M: 0.8 | | 9 |
| A: 1.2; M: 1.6 | | 7 |
| A: 0.8; M: 0.8; S: 0.2 | | 9 |
| A: 0.8; M: 0.8 | 8 Oil | 7 |
| A: 0.8; M: 1.6 | do | 10 |
| A: 1.2; M: 0.8 | do | 10 |
| A: 1.2; M: 1.6 | do | 9 |
| A: 0.8; M: 0.8; S: 0.2 | do | 10 |
| A: 0.8; M: 0.8 | 5 Factice | 6 |
| A: 0.8; M: 0.8; S: 0.2 | do | 7 |
| B: 1.0; S: 1.0 | | 9 |
| B: 1.0; S: 2.0 | | 9 |
| C: 1.0; S: 1.0 | | 6 |
| C: 1.0; S: 2.0 | | 5 |
| C: 0.8; M: 0.8; S: 0.2 | | 8 |
| D: 1.0; S: 1.0 | | 5 |
| D: 1.0; S: 2.0 | | 8 |
| D: 0.8; M: 0.8 | | 9 |
| D: 0.8; M: 0.8; S: 0.1 | | 9 |
| D: 0.8; M: 0.8; S: 0.1 | 8 Oil | 8 |
| E: 1.0; S: 1.0 | | 7 |
| E: 1.0; S: 2.0 | | 7 |
| E: 0.8; M: 0.8; S: 0.2 | | 9 |
| F: 1.0; S: 1.0 | | 7 |
| F: 1.0; M: 1.0 | | 4 |
| F: 1.0; M: 1.0; S: 0.1 | | 7 |
| F: 1.0; S: 1.0 | 8 Oil | 10 |
| G: 1.0; S: 1.0 | | 5 |
| G: 1.0; S: 2.0 | | 10 |
| G: 1.0; M: 1.0 | | 4 |
| G: 1.0; M: 1.0; S: 0.1 | | 5 |
| H: 1.0; S: 1.0 | | 10 |
| H: 1.0; S: 2.0 | | 8 |
| J: 2.0 | | 5 |
| J: 1.0; S: 1.0 | | 6 |
| J: 0.8; M: 0.8 | | 8 |
| J: 0.8; M: 0.8; S: 0.1 | | 6 |
| K: 1.0; S: 1.0 | | 6 |
| K: 1.0; S: 2.0 | | 4 |
| L: 1.0; S: 1.0 | | 8 |
| L: 0.8; M: 0.8 | | 9 |

A = n-cyclohexyl-benzthiazyl-sulfenamide
B = n-diethyl-benzthiazyl-sulfenamide
C = 2-mercapto-benzthiazole
D = zn-salt of 2-mercapto-benzthiazole
E = di-benzthiazyl-disulfide
F = heptaldehyde-aniline-condensation product
G = di-ortho-tolyl-guanidine
H = polyethylene-polyamine
J = tetramethyl thiuramidisulfide
K = tetramethyl thiurammonsulfide
L = zn-dimethyl-dithiocarbamate
M = di-morpholinyl-disulfide
S = sulfur

EXAMPLE 2

All of the vulcanized products described in Examples 2 to 6 are produced, unless expressely stated otherwise, by mixing the following components:

| | Parts by weight |
|---|---|
| Rubber | 100 |
| "HAF" carbon black | 50 |
| Stearic acid | 2 |
| Zinc oxide | 5 |
| Phenyl-β-naphthylamine | 1 |
| N-cyclohexyl-benzthiazyl-sulfenamide | 0.75 |
| Sulfur, variable. | | and then heating to 150° C. over a period of 30 minutes.

Cis-polybutadiene and a copolymer of butadiene-styrene having 23 parts styrene (SBR) are mixed in the mentioned proportions. Table 4 lists the tear strength values of the vulcanized products.

TABLE 4

Tear strength values of cis-polybutadiene-SBR-mixtures, 1.0 parts of sulfur

| Proportions of Mixture | | Tear Strength (kg.) Ring Test according to Pohle |
|---|---|---|
| Cis-poly-butadiene | SBR | |
| 100 | | 10 |
| 90 | 10 | 13 |
| 80 | 20 | 20 |
| 70 | 30 | 18 |
| 50 | 50 | 16 |
| 25 | 75 | 15 |
| | 100 | 15 |

The maximum of the listed tear strength is at the point of replacement of 20 parts of the cis-polybutadiene by SBR.

Table 5 shows the dependency of the tear strength on the sulfur quantity, in the vulcanized products of an optimum cis-polybutadiene-SBR-mixture.

TABLE 5

Dependenly of the tear strength on the quantity of sulfur, 80 parts cis-polybutadiene, 20 parts SBR

| Sulfur, in parts: | Tear strength in kilograms, ring test according to Pohle |
|---|---|
| 0.75 | 17 |
| 1.0 | 20 |
| 1.2 | 18 |
| 1.5 | 14 |
| 2.0 | 10 |

The maximum tear strength is obtained with 1.0 part sulfur. However, it is only by the combination of substituting 20 parts of the cis-polybutadiene, and controlling the degree of cross-linking (see Tables 4 and 5) by using the vulcanization system N-cyclohexyl-benzthiazyl-sulfenamide/sulfur in quantities of 0.75/1.0 parts, that a maximum tear strength of the vulcanized product can be achieved. Deviations from the claimed range, with respect to the quantitative proportion of cis-polybutadiene/elastomer, as well as with respect to the quantity of the cross-linking agent, effect a substantial decrease in tear strength (Table 4 shows the influence of the composition of the mixture, Table 5 shows the influence of the sulfur content).

EXAMPLE 3

Example 2 (Table 4) is repeated, but a different elastomer is employed—a butadiene - acroylonitrile copolymer having 28% by weight of acrylonitrile (nitrile rubber). The maximum tear strength is achieved at the same proportions and with the same cross-linking condition as in Example 2. This makes it apparent that the type of elastomer is relatively unimportant as compared to its proportion and the cross-linking agents.

TABLE 6

Tear strength values of mixtures of cis-polybutadiene with nitrile rubber, and 1.0 part sulfur

| Proportions of Mixture | | Tear Strength in kilograms, Ring Test according to Pohle |
|---|---|---|
| Cis-poly-butadiene | Nitrile Rubber | |
| 100 | | 10 |
| 90 | 10 | 17 |
| 80 | 20 | 19 |
| 70 | 30 | 14 |
| 50 | 50 | 11 |
| 25 | 75 | 11 |
| | 100 | 13 |

TABLE 7

Dependency of the tear strength on the sulfur quantity, 80 parts cis-polybutadiene, 20 parts nitrile rubber

| Sulfur, in parts: | Tear strength in kilograms, ring test according to Pohle |
|---|---|
| 0.75 | 15 |
| 1.0 | 19 |
| 1.2 | 18 |
| 1.5 | 16 |
| 2.0 | 14 |
| 2.5 | 12 |

EXAMPLE 4

The same procedure is followed as set out in Examples 2 and 3, only still another elastomer is used—natural rubber. A maximum of the tear strength is again achieved at the same mixture proportion and at the same cross-linking condition. This example corroborates the conclusions reached in Example 3.

TABLE 8

Tear strengths of cis-polybutadiene-natural rubber mixtures, 1.0 part sulfur

| Proportions of Mixture | | Tear Strength in kilograms, Ring Test according to Pohle |
|---|---|---|
| Cis-poly-butadiene | Natural Rubber | |
| 100 | | 10 |
| 90 | 10 | 17 |
| 80 | 20 | 29 |
| 70 | 30 | 28 |
| 50 | 50 | 26 |
| 25 | 75 | 31 |
| | 100 | 37 |

TABLE 9

Dependency of the tear strength on the sulfur quantity, 80 parts cis-polybutadiene, 20 parts natural rubber

| Sulfur, in parts: | Tear strength in kilograms, ring test according to Pohle |
|---|---|
| 0.75 | 22 |
| 1.0 | 29 |
| 1.2 | 28 |
| 1.5 | 23 |
| 2.0 | 17 |
| 2.5 | 16 |

EXAMPLE 5

Example 2 is again repeated, but a variety of different elastomers are employed as mixture components. The values of tear strength obtained thereby are tabulated in Table 10.

TABLE 10

Tear strength values of mixtures of cis-polybutadiene with other elastomers

| Elastomer | Parts | Sulfur, parts | Test Strength (kg.) Ring Test, Pohle |
|---|---|---|---|
| Trans-polybutadiene | 10 | 1.0 | 19 |
|  | 10 | 1.5 | 17 |
|  | 10 | 2.0 | 13 |
| Nitrile rubber [1] | 10 | 1.0 | 17 |
|  | 20 | 0.75 | 14 |
|  | 20 | 1.0 | 20 |
|  | 20 | 1.5 | 18 |
|  | 30 | 1.0 | 17 |
| Li-polybutadiene [2] | 20 | 1.0 | 18 |
|  | 20 | 1.5 | 12 |
| Emulsion polybutadiene | 20 | 1.0 | 22 |
|  | 20 | 1.5 | 16 |
|  | 20 | 2.0 | 12 |
| Poly-2-chlorobutadiene | 10 | 1.0 | 17 |
|  | 10 | 1.5 | 12 |
| Cis-polyisoprene | 20 | 1.0 | 23 |
|  | 20 | 1.5 | 20 |
|  | 20 | 2.0 | 13 |
| Nitrile rubber/SBR | 20/5 | 1.0 | 24 |
|  | 20/5 | 1.5 | 20 |
|  | 20/5 | 2.0 | 17 |

[1] Copolymer of butadiene-acrylonitrile having 38% by weight acrylonitrile.
[2] Polybutadiene produced in solution with a lithium catalyst.

With all of these tested elastomers used in the specified range, there is achieved a substantial increase in tear strength of cis-polybutadiene vulcanized products.

EXAMPLE 6

In Table 11, there is shown the addition of an alkali metal, alkaline earth, zinc, or aluminum salt of higher unsaturated carboxylic acids of 10 to 30 carbon atoms to carbon black filled cis-polybutadiene vulcanized products wherein 10 to 30 parts of the cis-polybutadiene are substituted by another elastomer.

TABLE 11

Tear strength of cis-polybutadiene mixtures with other elastomers when adding salts of higher unsaturated carboxylic acids

| Elastomer | Parts | Salt | Parts | Tear Strength, kg. Without salt (1.0 part sulfur) | With salt (2.0 parts sulfur) |
|---|---|---|---|---|---|
| Nitrile rubber | 20 | Barium oleate | 10 | 19 | 22 |
| SBR | 20 | do | 10 | 20 | 23 |
| Emulsion polybutadiene | 20 | do | 10 | 22 | 24 |
| Natural rubber | 20 | do | 10 | 29 | 32 |
| Do | 20 | Sodium abietate | 10 | 29 | 33 |

The preceding table indicates that in all cases an increase in tear strength is attained by the addition of the carboxylic acid salt.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof can make various changes and modifications of the invention to adapt it to various usages and conditions. Consequently, such changes and modifications are properly, equitably, and intended to be, within the full range of equivalents of the following claims.

What is claimed is:

1. A high tear strength vulcanized product obtained by vulcanizing a composition comprising on a weight basis 0.5–1.2 parts of N-substituted benzthiazyl-sulfenamide, 0.8–1.3 parts sulfur, 40–80 parts carbon black, about 90–70 parts cis-polybutadiene having at least 85% cis 1,4 double bonds and less than 5% trans 1,4 double bonds, and about 10–30 parts of an elastomer selected from the group consisting of poly-2-chloro-butadiene, polyisobutylene, polyisobutylene-isoprene, polybutadiene-acrylonitrile, polybutadiene - styrene - acrylonitrile, and polyethylene-propylene.

2. A high tear strength vulcanized composition as defined by claim 1, further comprising 5–15 parts of an ethylenically unsaturated hydrocarbon carboxylic acid salt of 10–30 carbon atoms of a metal selected from the group consisting of alkali metal and alkaline earth metal, and an additional 0.5 to 1.5 parts by weight of sulfur.

3. In a vulcanizing process for the production of carbon black reinforced vulcanized products of cis-polybutadiene having at least 85% cis 1,4 double bonds and less than 5% trans 1,4 double bonds, the improvement which comprises replacing about 10–30% by weight of said cis-polybutadiene with an elastomer selected from the group consisting of poly-2-chlorobutadiene, polyisobutylene, polyisobutylene-isoprene, polybutadiene-acrylonitrile, polybutadiene-styrene-acrylonitrile, polyethylene-propylene, and mixtures thereof, and employing a vulcanization system of N-substituted benzthiazyl-sulfenamide/sulfur in parts by weight of 0.5–1.2/0.8–1.3, respectively, based on 100 parts by weight of total elastomer, and conducting the vulcanization process at 130–170° C. to impart high tear strength to the vulcanized product.

4. A process as defined by claim 3 wherein the ratio of the N-substituted benzthiazyl-sulfenamide/sulfur is 0.6–1.0/0.8–1.3.

5. A process as defined by claim 3, further comprising adding 5–15 parts by weight based on the total elastomer of an ethylenically unsaturated hydrocarbon carboxylic acid salt of 10–30 carbon atoms of a metal selected from the group consisting of alkali metal and alkaline earth metal, and an additional 0.5 to 1.5 parts by weight of sulfur.

6. A process as defined by claim 5 wherein said carboxylic acid salt is a salt of oleic acid, abietic acid or linoleic acid.

7. In a vulcanizing process for the production of carbon black reinforced vulcanized products of cis-polybutadiene having at least 85% cis 1,4 double bonds and less than 5% trans 1,4 double bonds, the improvement which comprises replacing about 10–30% by weight of said cis-polybutadiene with an elastomer selected from the group consisting of a polybutadiene having other than a 1,4-cis-structure, natural rubber, polyisoprene, poly-2-chlorobutadiene, polyisobutylene, polyisobutylene - isoprene, polybutadiene-styrene, polybutadiene-acrylonitrile, polybutadiene - styrene - acrylonitrile, and polyethylene-propylene, and employing a vulcanization system of N-substituted benzthiazyl-sulfenamide/sulfur in parts by weight of 0.5–1.2/1.2–3.5, respectively, based on 100 parts by weight of total elastomer, together with 5–15 parts by weight based on the total elastomer of an ethylenically unsaturated hydrocarbon carboxylic acid salt of 10–30 carbon atoms of a metal selected from the group consisting of an alkali metal, an alkaline earth metal, and conducting the vulcanization process at 130–170° C. to impart high tear strength to the vulcanized product.

8. A process as defined by claim 7 wherein said carboxylic acid salt is a salt of oleic acid, abietic acid or linoleic acid.

9. A high tear strength vulcanized product obtained by vulcanizing a composition comprising on a weight basis 0.5–1.2 parts of N-substituted benzthiazyl sulfenamide, 1.2–2.7 parts sulfur, 40–80 parts carbon black, about 90–70 parts cis-polybutadiene having at least 85% cis 1,4 double bonds and less than 5% trans 1,4 double bonds and about 10–30 parts of an elastomer selected from the group consisting of polybutadiene having other than a 1,4-cis-structure, natural rubber, polyisoprene, poly-2-chlorobutadiene, polyisobutylene, polyisobutylene - isoprene, polybutadiene-styrene, polybutadiene-acrylonitrile, polybutadiene - styrene - acrylonitrile, and polyethylene-propylene, and 5–15 parts of an ethylenically unsaturated hydrocarbon carboxylic acid salt of 10–30 carbon atoms of a metal selected from the group consisting of alkali metal and alkaline earth metal.

10. A vulcanized composition as defined by claim 2 wherein said carboxylic acid salt is a salt of oleic acid, abietic acid, or linoleic acid.

11. A vulcanized composition as defined by claim 9 wherein said carboxylic acid salt is a salt of oleic acid, abietic acid, or linoleic acid.

12. A vulcanizable composition comprising on a weight basis 0.5–1.2 parts of N-substituted benzthiazyl sulfenamide, about 1.0 parts sulfur, 40–80 parts carbon black, about 90–70 parts cis-polybutadiene having at least 85% cis 1,4 double bonds and less than 5% trans 1,4 double bonds and about 10–30 parts of an elastomer selected from the group consisting of poly-2-chloro-butadiene, polyisobutylene, polyisobutylene-isoprene, polybutadiene-styrene, polybutadiene - acrylonitrile, polybutadiene - styrene-acrylonitrile, and polyethylene-propylene.

13. A vulcanizable composition comprising on a weight basis 0.5–1.2 parts of N-substituted benzthiazyl-sulfenamide, 0.8–1.3 parts sulfur, 40–8 parts carbon black, about 90–70 parts cis-polybutadiene having at least 85% cis 1,4 double bonds and less than 5% trans 1,4 double bonds, and about 10–30 parts of an elastomer selected from the group consisting of poly-2-chloro-butadiene, polyisobutylene, polyisobutylene-isoprene, polybutadiene-styrene, polybutadiene - acrylonitrile, polybutadiene - styrene-acrylonitrile and polyethylene-propylene.

14. A vulcanizable composition comprising on a weight basis 0.5–1.2 parts of N-substituted benzthiazyl sulfenamide, 1.2–2.7 parts sulfur, 40–80 parts carbon black, about 90–70 parts cis-polybutadiene having at least 85% cis 1,4 double bonds and less than 5% trans 1,4 double bonds and about 10–30 parts of an elastomer selected from the group consisting of polybutadiene having other than a 1,4-cis-structure, natural rubber, polyisoprene, poly-2-chloro-butadiene, polyisobutylene, polyisobutylene-isoprene, polybutadiene-styrene, polybutadiene-acrylonitrile, polybutadiene-styrene-acrylonitrile, and polyethylene-propylene, and 5–15 parts of an ethylenically unsaturated hydrocarbon carboxylic acid salt of 10–30 carbon atoms of a metal selected from the group consisting of alkali metal and alkaline earth metal.

15. A vulcanizable composition as defined by claim 14 wherein said carboxylic acid salt is a salt of oleic acid, abietic acid, or linoleic acid.

16. In a vulcanizing process for the production of carbon black reinforced vulcanized products of cis-polybutadiene having at least 85% cis 1,4 double bonds and less than 5% trans 1,4 double bonds, the improvement which comprises replacing about 10–30% by weight of said cis-polybutadiene with an elastomer selected from the group consisting of a polybutadiene having other than a 1,4-cis-structure, natural rubber, polyisoprene, poly-2-chlorobutadiene, polyisobutylene, polyisobutylene-isoprene, polybutadiene-styrene, polybutadiene-acrylonitrile, polybutadiene-styrene-acrylonitrile, and polyethylene-propylene, and employing a vulcanization system of N-substituted benzithiazyl-sulfenamide/sulfur in parts by weight of 0.5–1.2/1.2–3.5, respectively, based on 100 parts by weight of total elastomer, together with 5–15 parts by weight based on the total elastomer of sodium abietate, and conducting the vulcanization process at 130–170° C. to impart high tear strength to the vulcanized product.

17. A process as defined by claim 16 wherein said elastomer is natural rubber.

18. A high tear strength vulcanizer product obtained by vulcanizing a composition comprising on a weight basis 0.5–1.2 parts of N-substituted benzthiazyl sulfenamide, 1.2–2.7 parts sulfur, 40–80 parts carbon black, about 90–70 parts cis-polybutadiene having at least 85% cis 1,4 double bonds and less than 5% trans 1,4 double bonds and about 10–30 parts of an elastomer selected from the group consisting of polybutadiene having other than a 1,4-cis-structure, natural rubber, polyisoprene, poly-2-chlorobutadiene, polyisobutylene, polyisobutylene-isoprene, polybutadiene-styrene, polybutadiene-acrylonitrile, polybutadiene-styrene-acrylonitrile, and polyethylene-propylene, and 5–15 parts of sodium abietate.

19. A vulcanized composition as defined by claim 18 wherein said elastomer is natural rubber.

20. A vulcanizable composition comprising on a weight basis 0.5–1.2 parts of N-substituted benzthiazyl sulfenamide, 1.2–2.7 parts sulfur, 40–80 parts carbon black, about 90–70 parts cis-polybutadiene having at least 85% cis 1,4 double bonds and less than 5% trans 1,4 double bonds and about 10–30 parts of an elastomer selected from the group consisting of polybutadiene having other than a 1,4-cis-structure, natural rubber, polyisoprene, poly-2-chlorobutadiene, polyisobutylene, polyisobutylene-isoprene, polybutadiene-styrene, polybutadiene-acrylonitrile, polybutadiene-styrene-acrylonitrile, and polyethylene-propylene, and 5–15 parts of sodium abietate.

21. A vulcanizable composition as defined by claim 20 wherein said elastomer is natural rubber.

22. In a vulcanizing process for the production of carbon black reinforced cis-polybutadiene having at least 85% cis 1,4 double bonds and less than 5% trans 1,4 double bonds, the improvement which comprises replacing about 10–30% by weight of said cis-polybutadiene with a mixture of polybutadiene-acrylonitrile and polybutadiene-styrene, and employing a vulcanization system of N-substituted benzthiazyl-sulfenamide/sulfur in parts by weight of 0.5–1.2/0.8–1.3, respectively, based on 100 parts by weight of total elastomer, and conducting the vulcanization process at 130–170° C. to impart high tear strength to the vulcanized product.

23. A process as defined by claim 22 wherein the weight ratio of polybutadiene-acrylonitrile to polybutadiene-styrene is about 20:5, respectively.

24. A high tear strength vulcanized product obtained by vulcanizing a composition comprising on a weight basis 0.5–1.2 parts of N-substituted benzthiazyl sulfenamide, 0.8–1.3 parts sulfur, 40–80 parts carbon black, about 90–70 parts cis-polybutadiene having at least 85% cis 1,4 double bonds and less than 5% trans 1,4 double bonds and about 10–30 parts of a mixture of polybutadiene-acrylonitrile and polybutadiene-styrene.

25. A high tear strength vulcanized product as defined by claim 24 wherein the weight ratio of polybutadiene-acrylonitrile to polybutadiene-styrene is about 20:5, respectively.

References Cited

UNITED STATES PATENTS

| | | | |
|---|---|---|---|
| 3,060,989 | 10/1962 | Railsback et al. | 152—330 |
| 3,207,741 | 9/1965 | Schafer et al. | 260—94.3 |
| 3,225,122 | 12/1965 | Stumpe | 260—894 |
| 3,244,773 | 4/1966 | Crouch | 260—894 |
| 3,264,237 | 8/1966 | Sarbach et al. | 260—23.7 |
| 3,280,876 | 10/1966 | Snow | 152—330 |
| 3,281,389 | 10/1966 | Hirshfield | 260—33.6 |

OTHER REFERENCES

Barron, "Modern Synthetic Rubbers," 1949, p. 265.
"Compounding Ingredients for Rubber," 1961, pp. 217, 227, 228, 260.

DONALD C. CZAJA, Primary Examiner

R. A. WHITE, Assistant Examiner

U.S. Cl. X.R.

260—23.7, 27, 41.5, 79.5, 888, 889, 890, 894; 152—330

UNITED STATES PATENT OFFICE
CERTIFICATE OF CORRECTION

Patent No 3,501,422          Dated March 17, 1970

Inventor(s) Karl-Heinz Nordsiek, Pranz Peter van de Kamp, Freidrich Zeppernick, Gunter Simon.

It is certified that error appears in the above-identified patent and that said Letters Patent are hereby corrected as shown below:

Column 1, Line 68, change "is" to ---if--------

Column 2, Line 28 change "10.30%" to ----10-30% -----

Column 5, Line 41, change "Dependenly" to =----------
- - dependency---

Column 9, Line 25, change "40-8" to ---40-80---------

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents